Figures 1, 2, 3:
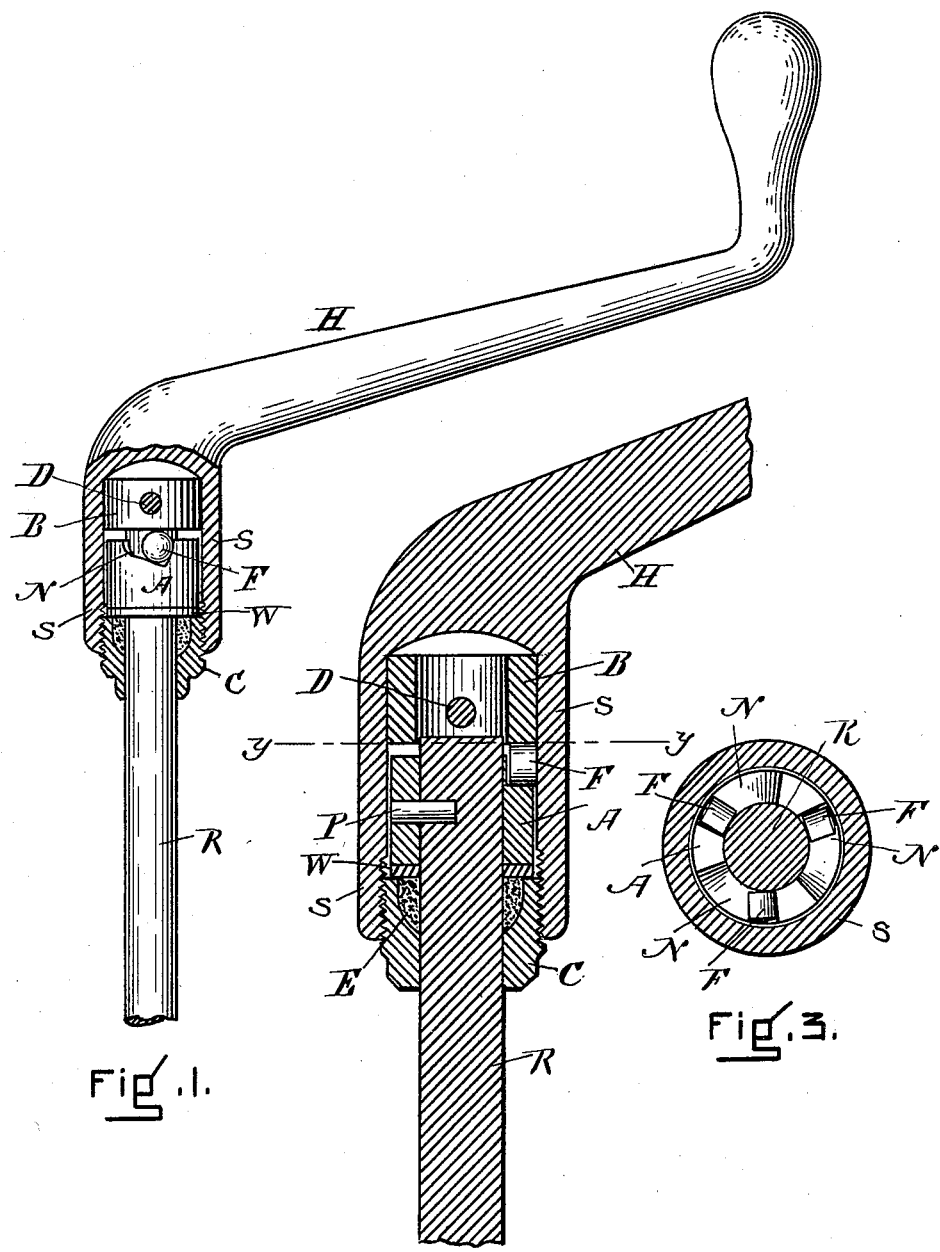

(No Model.)

A. B. COLLETT.
CAR BRAKE HANDLE.

No. 513,033. Patented Jan. 16, 1894.

WITNESSES
A. J. Burrow
T. J. Cunningham

INVENTOR
Austin B. Collett

UNITED STATES PATENT OFFICE.

AUSTIN B. COLLETT, OF LYNN, ASSIGNOR OF ONE-HALF TO JOHN S. BAKER, OF BEVERLY, MASSACHUSETTS.

CAR-BRAKE HANDLE.

SPECIFICATION forming part of Letters Patent No. 513,033, dated January 16, 1894.

Application filed November 10, 1893. Serial No. 490,605. (No model.)

*To all whom it may concern:*

Be it known that I, AUSTIN B. COLLETT, of Lynn, in the county of Essex and State of Massachusetts, have invented certain new and useful Improvements in Car-Brake Handles, of which the following description is a specification.

My invention relates to improvements in brake-handles adapted for use chiefly upon street cars, where the frequent variations in the load constantly change the position of the brake-shoes and consequently cause a variation in the amount of chain which is necessary to wind upon the brake staff to properly set the brakes, thus varying the final position of the brake handle to accomplish it.

Various ratchet devices have heretofore been employed to enable the car-driver easily to turn the brake-handle upon the brake rod, into a position to enable him to operate the brake to the best advantage, and the construction chiefly in use has been made with clutches the two members of which have interlocking teeth which are held in contact by means of spring pressure.

My invention consists in combining with the brake-handle a clutch which I designate a friction roll clutch, thereby entirely dispensing with springs, and the noise and jar caused by turning the ratchet teeth over each other, as also reducing the cost of manufacture.

My improvements will be readily understood by reference to the drawings forming a part of this specification in which—

Figure 1 is an elevation of the brake-handle and staff, with the socket portion of the handle and a screw collar therein in section, to show the construction of the clutch and the relative position of the several parts therein. Fig. 2, is a central vertical section through the handle, socket and the parts contained therein. Fig. 3, is a plan view on line $y$—$y$ Fig. 2.

In the drawings H is the brake-handle having a socket S, in its lower portion.

R is the brake-rod or staff, upon which one portion A, of the roll clutch is secured by shrinking, or by a pin P.

Around the upper edge of the portion A three or more notches N, are made, each with an inclined bottom surface. In these notches are friction rolls F, which bear against the lower surface of the ring B, in the upper part of the socket S, when the staff R with the clutch member A, are secured in place within the socket. The ring B may be held in the socket by a pin D. By means of a collar C loose upon the staff R, but securely fastened to the socket S, the parts are secured together and the clutch members held in operative relation. I prefer to secure the collar C to the socket S by screwing one upon the other, as the pressure of the friction rolls F, against the bearing surface of the ring B can be thereby more readily regulated.

In order to render the socket a chamber sufficiently tight to retain the lubricating material which may be used therein, the collar C is chambered at E and filled with felt or other suitable packing material; and to provide a better bearing for the part A, a steel washer W is interposed between it and the collar C.

In operation, when the handle H, is turned in the direction of the movement of the hands of a watch, or toward the person facing the drawings, the tendency of the rolls F will be to roll up the inclined surfaces of the bottom of the notches N; but by reason of their bearing upon the ring B, friction between the parts will cause the member A and with it the brake staff R, to turn with the handle. When, however, the handle H is turned in the opposite direction the rolls F will bear against the abrupt side of the notches N, and freely turn, thus allowing the handle to be turned back to any desired position without turning the staff R.

I claim—

1. In combination with a brake-handle a friction roll clutch, one member of which is secured to the brake-rod and is provided with notches in its upper surface which contain said rolls the other member of which is secured to the brake-handle, and a loose collar upon said rod beneath its clutch member, which collar is secured to the handle and thereby holds the clutch members in contact.

2. The combination of a brake-rod, a clutch member fixed upon its upper end, a series of notches with inclined lower surfaces formed in the top of said clutch-member; friction rolls in said notches, a handle with a socket to contain said clutch-member and friction rolls, a bearing surface for said rolls within the said socket, and a collar upon the brake-rod which is adapted to be secured to the brake-handle beneath the said clutch-member and hold the friction rolls in contact with the said bearing surface.

3. In combination with a brake-handle having a socket in its lower end, a clutch therein to engage the brake rod when the handle is turned in one direction, and move freely upon said rod when turned in the other direction; a chambered collar secured to the handle and loose upon said rod beneath the clutch-members, and a packing within said chamber for the purpose described.

AUSTIN B. COLLETT.

Witnesses:
A. J. BURROW,
T. J. CUNNINGHAM.